United States Patent
Zwack

(10) Patent No.: US 7,372,846 B2
(45) Date of Patent: May 13, 2008

(54) METHOD FOR TRANSMITTING TIME INFORMATION VIA A DATA PACKET NETWORK

(75) Inventor: Eduard Zwack, Puchheim (DE)

(73) Assignee: Siemens Aktiengesellschaft, Munich (DE)

( * ) Notice: Subject to any disclaimer, the term of this patent is extended or adjusted under 35 U.S.C. 154(b) by 944 days.

(21) Appl. No.: 10/163,621

(22) Filed: Jun. 7, 2002

(65) Prior Publication Data

US 2003/0002483 A1    Jan. 2, 2003

(30) Foreign Application Priority Data

Jun. 7, 2001    (DE)    ................. 101 27 738

(51) Int. Cl.
*H04L 12/28* (2006.01)
*H04J 3/24* (2006.01)
*G06F 15/16* (2006.01)

(52) U.S. Cl. ............... 370/352; 370/389; 370/473; 370/503; 709/248

(58) Field of Classification Search ........ 370/350–354, 370/389–394, 432–458, 503–516; 709/231–236, 709/248

See application file for complete search history.

(56) References Cited

U.S. PATENT DOCUMENTS

| | | | | | |
|---|---|---|---|---|---|
| 5,566,180 | A | * | 10/1996 | Eidson et al. | ............... 370/473 |
| 5,602,992 | A | * | 2/1997 | Danneels | ............... 709/248 |
| 5,848,028 | A | * | 12/1998 | Burklin | ............... 368/46 |
| 6,185,217 | B1 | * | 2/2001 | Ando et al. | ............... 370/403 |
| 6,278,710 | B1 | * | 8/2001 | Eidson | ............... 370/394 |
| 6,654,356 | B1 | * | 11/2003 | Eidson et al. | ............... 370/303 |
| 6,876,670 | B1 | * | 4/2005 | Budrikis et al. | ............... 370/474 |
| 6,882,637 | B1 | * | 4/2005 | Le et al. | ............... 370/349 |
| 6,975,653 | B2 | * | 12/2005 | Eidson | ............... 370/503 |
| 2002/0075894 | A1 | * | 6/2002 | Yoshida et al. | ............... 370/463 |
| 2002/0181459 | A1 | * | 12/2002 | Ohta et al. | ............... 370/389 |
| 2003/0154309 | A1 | * | 8/2003 | Kero et al. | ............... 709/248 |

FOREIGN PATENT DOCUMENTS

| | | |
|---|---|---|
| DE | 42 15 380 A1 | 11/1993 |
| DE | 198 15 647 A1 | 10/1999 |
| EP | 0247026 A2 | 11/1987 |
| EP | 0722233 A2 | 7/1996 |
| WO | WO00/28400 | 5/2000 |

* cited by examiner

*Primary Examiner*—Man U. Phan
(74) *Attorney, Agent, or Firm*—Staas & Halsey LLP

(57) ABSTRACT

Time information which is to be transmitted via a data packet network is called up from a time information source and is transmitted to a data packet transmission module. The data packet transmission module controls the transmission time of a data packet in which the time information is transmitted via the data packet network. The transmission time and the calling of the time information are aligned with respect to one another in time by a transmission signal which is generated by the time information source or by the data packet transmission module and indicates the transmission time.

17 Claims, 2 Drawing Sheets

METHOD FOR TRANSMITTING TIME INFORMATION VIA A DATA PACKET NETWORK

CROSS REFERENCE TO RELATED APPLICATIONS

This application is based on and hereby claims priority to German Application No. 10127738.5 filed on Jun. 7, 2001, the contents of which are hereby incorporated by reference.

BACKGROUND OF THE INVENTION

Real-time communications devices and data processing devices are increasingly being networked by data packet networks, such as local area networks (LAN), ATM networks (ATM: Asynchronous Transfer Mode), the Internet or other data networks based on the Internet Protocol (IP). Many communications or data processing applications require the current time or some other accurate time reference. Real time clocks (RTC) or crystal-controlled timers are provided for this purpose in most communications or data processing devices.

In a networked system, the real time clocks of the networked communications and data processing devices must be synchronized in order to provide a standard time reference throughout the network. The respectively required synchronization accuracy in this case depends essentially on the nature of the applications which are distributed via the network. While pure data processing applications generally result in synchronization requirements which are not very stringent, high synchronization accuracy is generally required for real-time communications applications. A high level of clock synchronicity is required in particular for connection-oriented communications technologies which are actually synchronous and which at present are being increasingly ported onto asynchronous data packet networks.

Synchronization of a number of real-time clocks or timers in a network requires that the time information be transmitted as accurately as possible between the network devices to be synchronized.

In the past, the so-called NTP protocol (Network Time Profile) has frequently being used for synchronization of network devices in data packet networks. The NTP protocol is described, for example, in the document "Request For Comments 1305: Network Time Protocol (Version 3), Specification, Implementation and Analysis", by David L. Mills dated March 1992. Within the NTP protocol, time information originating from a time information source is transmitted within data packets via the data packet network. The synchronization error resulting from transmission delays can be reduced by repeatedly transmitting time information at predetermined time intervals and, possibly, in different directions. However, the synchronization accuracy of the NTP protocol is restricted by the delay time fluctuations, which are unavoidable in networks based on the Internet Protocol, and fluctuations in the packet processing times in network devices, such as routers or switching nodes. Fluctuations such as these are typically in the range from 1 to 100 milliseconds. Thus, in a good situation, a synchronization accuracy of only about 1 millisecond can be achieved by the NTP protocol. However, this accuracy is inadequate for many real-time network applications.

SUMMARY OF THE INVENTION

One potential object of the present invention is to specify a method for transmitting time information via a data packet network, which makes it possible to achieve better synchronization accuracy.

In the method according to one aspect of the invention, time information is called up from a time information source and is transmitted within a data packet via a data packet network, for example a local area network (LAN) or a wide area network (WAN), such as the Internet. The time information which is called up is for this purpose transmitted to a data packet transmission module, for example a network card, which controls a transmission time of the data package. According to one aspect of the invention, the transmission time and the calling of the time information are in this case aligned with respect to one another in time by a transmission signal which is generated by the time information source or by the data packet transmission module and indicates the transmission time.

The active time alignment of the precise transmission time with the calling of the time information avoids the fluctuations which otherwise occur in the time interval between calling the time information and the actual transmission of the data packet containing the time information. In known systems, fluctuations such as these are caused by program interrupts and waiting times which occur unpredictably between calling the time information and the actual transmission of the data packet.

In the known NTP protocol, which has no direct control over the precise transmission time of a data packet, the time fluctuations are in the region of 1 millisecond and thus restrict the achievable synchronization accuracy. In contrast, with the method described above, fluctuations in the time interval between the calling of the time information and the actual transmission of the data packet can be largely avoided, thus resulting in better synchronization accuracy.

According to one embodiment of the invention, the transmission signal can be generated by the data packet transmission module in the course of the transmission process, for example at the start of transmission of the data packet. The transmission time of the data packet is thus indicated by the transmission signal, to be precise by its generation time. The calling of the time information from the time information source can be initiated by the generated transmission signal. In this way, the time information which is the most accurate at the respective transmission time can be inserted into the data packet to be transmitted.

According to a further embodiment of the invention, the transmission signal can be generated by the time information source. The transmission signal is in this case generated at a predetermined time, and initiates the transmission of the data packet. Time information which corresponds to the predetermined time may in this case actually be inserted into the data packet to be transmitted, in advance. There is therefore no need to insert the time information at the actual transmission time of the data packet.

The data packet can preferably be transmitted via the data packet network using a transmission protocol in the TCP/IP protocol family.

According to one advantageous development of the invention, a data packet reception time which is as accurate as possible can also be recorded on receiving a data packet which is transmitted via the data packet network. For this purpose, a data packet reception module can generate a reception signal which initiates a call for reception time information from a further time information source, for example from a real-time clock of a respective data pocket receiver. This means that fluctuations in the time interval between the actual reception of the data packet and the evaluation of the time information contained in it cannot have any negative effect on the synchronization accuracy.

Any relative discrepancy between the time information sources contained in the transmitter and receiver of the data packet can be determined from the reception time information and from the time information transmitted in the data packet. In order to improve the accuracy, the delay time of the data packet can be taken into account in the process of determining the discrepancy. The delay time can be determined, for example, by the receiver of the data packet transmitting a further data packet with further time information, using the method described above, back to the original transmitter. There, the processing delay in the receiver can be determined on the basis of the time information transmitted in the further data packet, so that it is possible to calculate a value for the sum of the pure delay times in both directions. If there is a direct connection between the transmitter and receiver, for example by an Ethernet cable, the pure cable delay times are generally very short and delay time fluctuations are virtually negligible.

Provided that the pure delay times between the transmitter and receiver are largely constant, a very high level of synchronization accuracy can be achieved in the manner described above. However, there are often one or more network nodes of the data packet network between the transmitter and receiver, such as router devices, or switching nodes, which in each case pass on data packets to be transmitted only after a short processing time. However, these processing times are subject to generally irregular fluctuations as a result of program interrupts and waiting times for control programs running in the network nodes. These fluctuations make up a considerable proportion of the delay time fluctuations for the data packets transmitted via the data packet network.

One potential advantage of the method is to avoid processing time fluctuations which occur in the network nodes from having a negative effect on the synchronization accuracy. According to this development, a reception signal is also generated on reception of the data packet in a network node which passes on the data packet and initiates a call for reception time information, which indicates the reception time, from a time information source in the network node. This reception time information is passed on with the data packet, together with transmission time information which indicates the time at which it was passed on. The time for which the data packet has remained in the network node can be calculated from the difference between the transmission time information and the reception time information. A further receiver of the data packet can use the time information additionally passed on with the data packet to eliminate the time for which the data packet has remained in the network node and hence also to eliminate the fluctuations in the time for which the data packet has remained in the network node, when calculating the relative discrepancy between the time information sources involved. In order to achieve synchronization accuracy which is as good as possible, as far as possible all the network nodes which are located on the route between the time information sources to be synchronized should record the respective reception time and transmission time in the described manner, and should pass it on in the form of additional time information with the data packet.

According to one advantageous embodiment, the transmission signal and/or the reception signal can be generated and/or evaluated by hardware components.

Furthermore, the transmission signal and/or the reception signal can be generated and/or evaluated in the physical layer, that is to say Layer 1, of the OSI reference model. This allows the transmission time and reception time as well as the calling of the time information to be aligned to one another physically at an accurate time, or with a constant delay, with a physically accurate time.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
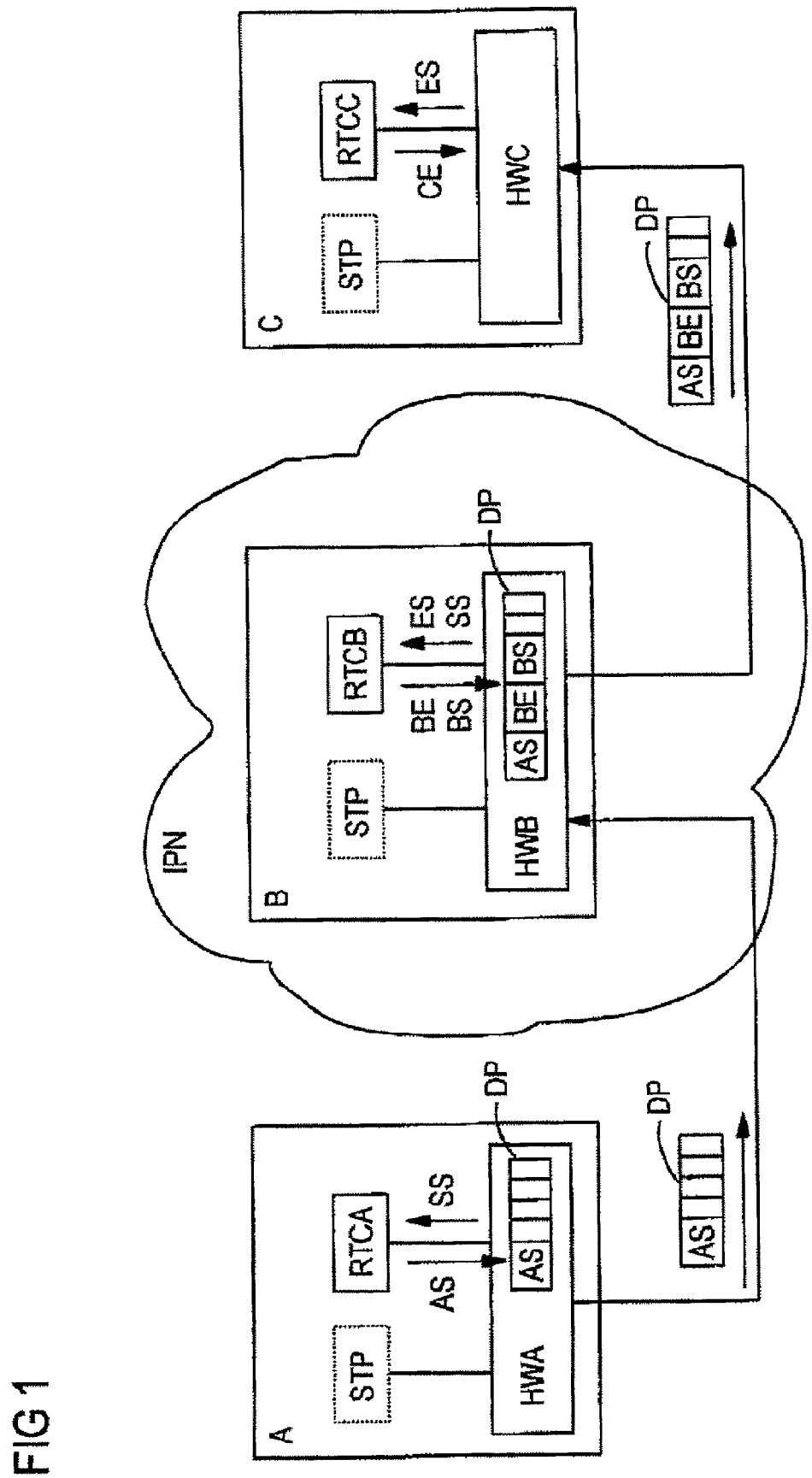
FIG. 1 shows communications devices which are to be synchronized via a data packet network.

Reference will now be made in detail to the preferred embodiments of the present invention, examples of which are illustrated in the accompanying drawings, wherein like reference numerals refer to like elements throughout.

FIG. 1 illustrates, schematically, two communications devices A and C which are to be synchronized and are coupled to an asynchronous data packet network IPN. For the present exemplary embodiment, it is assumed that the data transmission in the data packet network IPN is based on the so-called Internet Protocol (IP). The data packet network IPN may, for example, be in the form of a so-called local area network (LAN) or a wide area network (WAN) such as the Internet. The communications devices A and C to be synchronized may, for example, be terminals or servers for speech, video and/or data communication, or network devices for further communications networks.

The data packet network IPN contains a network node B via which data packets are interchanged between the communications devices A and C. The network node B may, for example, be a router device, a switching device, a gateway device or a so-called network bridge. For simplicity reasons, it is assumed for the present exemplary embodiment that only one such network node is located on the route between the communications devices A and C. However, the following statements may also be applied in an appropriate sense to the situation where there are a number of network nodes on the route between the communications devices A and C.

The communications devices A and C as well as the network node B each have a real-time clock RTCA, RTCC and RTCB, respectively, as time information source. The real-time clocks RTCA, RTCB and RTCC are each clocked independently of one another by crystal oscillators (not illustrated). The communications devices A and C as well as the network node B also each have a transmission/reception module HWA, HWC and HWB, respectively, for transmitting and receiving data packets. The transmission/reception modules HWA, HWB and HWC are each designed in the form of hardware assemblies, which allow direct control or recording of the accurate transmission or reception time of a data packet in the physical layer of the OSI reference model. The communications devices A and C are each coupled via their respective transmission/reception modules HWA and HWC to the data packet network IPN, and hence to the transmission/reception module HWB of the network node B. In order to control or record an accurate transmission or reception time, the transmission/reception modules HWA, HWB and HWC are each coupled to the respective real-time clocks RTCA, RTCB and RTCC.

For synchronization of the real-time clocks, a synchronization protocol STP with access to the respective transmission/reception module HWA, HWC or HWB is implemented in each of the communications devices A and C and in the network node B.

In the present exemplary embodiment, the real-time clock RTCA of the communications device A is intended to be synchronized via the data packet network IPN with the real-time clock RTCC of the communications device C. For this purpose, the communications device A transmits a data packet DP with transmission time information AS, which indicates the precise transmission time of the data packet DP, via the data packet network IPN to the communications device C.

In order to transmit the data packet DP, it is first of all loaded into a transmission register in the transmission/reception module HWA. At this stage, the transmission time information AS has not yet been inserted into the data packet DP. At the time when transmission of the data packet DP starts, the transmission/reception module HWA generates a transmission signal SS, which indicates the start of transmission, and transmits this to the real-time clock RTCA. The transmission signal SS may in this case be in the form, for example, of a time information element which indicates the transmission time or a pulse which indicates the transmission time by the time at which the pulse was generated. The transmission signal SS causes the real-time clock RTCA to transmit the current contents of its time register to the transmission/reception module HWA, where these current contents are inserted as transmission time information AS into the data packet DP at a physically accurate time. The data packet DP is thus transmitted, with the transmission time information AS which indicates the accurate physical transmission time, in the data packet network IPN to the network node B.

As an alternative to this, predetermined transmission time information AS may be loaded into the data packet DP even before the actual transmission process. In this case, the transmission of the data packet is initiated by the real-time clock RTCA, at a physically accurate time, at a time which is indicated by the predetermined transmission time information AS.

The data packet DP transmitted to the network node B is received by the transmission/reception module HWB and, in this case, is read to a reception register. At the start of the reception process, the transmission/reception module HWB generates a reception signal ES and transmits this to the real-time clock RTCB. The reception signal ES causes the current time to be called up from the real-time clock RTCB and to be buffer-stored as reception time information BE, which indicates the accurate reception time of the data packet DP. After receiving the entire data packet DP, destination address information (not illustrated) contained in it is evaluated by the network node B in order to pass on the data packet DP in the direction of its transmission destination C. In order to evaluate the destination address information, a so-called routing table is generally searched, looking for address information which at least partially matches in conventional data packet networks based on the Internet Protocol. In addition to evaluating the destination address information, the data packet or its payload data content may also be subjected to protocol conversion or to some other form of processing. The address evaluation and, if appropriate, the processing of the data packet DP leads to a time delay for the data packet DP. The respective duration of the delay is in this case generally subject to unpredictable fluctuations as a result of address search times, program interrupts and waiting times of different duration.

After evaluating the destination address information and, possibly, further processing of the data packet DP, this data packet DP is transmitted to a transmission register in the transmission/reception module HWB. The buffer-stored reception time information BE is then inserted as additional time information into the data packet DP. At the start of the process of passing on the data packet DP, the transmission/reception module HWB generates a transmission signal SS which is used to call the current time from the real-time clock RTCB and is inserted as additional transmission time information BS into the data packet DP at a physically accurate time. The data packet DP is thus transmitted together with the transmission time information AS and with the additional time information BE and BS to the communications device C.

The addition of the additional time information BE and BS is controlled by the synchronization protocol STP. The synchronization protocol STP may preferably be in the form of an extension to the widely used NTP protocol. The additional time information may in this case be transmitted in an extended cell header for NTP data packets. Transmission or reception time information inserted into a data packet is frequently also referred to as a time stamp.

If there are even more network nodes in the data packet network IPN or other communications networks on the route to the transmission destination C, each of these further network nodes should preferably pass on reception time information, which indicates the respective accurate reception time, and transmission time information, which indicates the respective accurate passing-on time, with the data packet DP. The addition of the additional time information considerably improves the achievable synchronization accuracy, since fluctuations in the processing times for the data packet DP within network nodes can be eliminated by calculation on the basis of the additional time information at the transmission destination, in this case C.

However it is not absolutely essential for all the network nodes on the route between the communications devices A and C to add additional time information to the data packet DP. In cases such as these, the achievable synchronization accuracy is restricted by the processing time fluctuations in those network nodes which do not add any additional time information. However, in general even in a situation such as this, the synchronization accuracy can be improved considerably in comparison to known systems, if the method described above is implemented in at least one communications device or in at least one network node.

In the present exemplary embodiment, the data packet DP provided with the time information AS, BE and BS is transmitted to the communications device C, and is received by its transmission/reception device HWC. When the reception process starts the transmission/reception module HWC generates a reception signal ES, which is used to call the current time from the real-time clock RTCC as reception time information CE.

The time for which the data packet DP remains in the network node B can be eliminated from the data packet delay time by calculation by the communications device C, on the basis of the reception time information BE and transmission time information BS transmitted with the data packet DP. However, the corresponding calculation rule CE−AS−(BS−BE) does not generally result in the accurate delay time, since the real-time clocks RTCA and RTCC generally have a small time offset. Furthermore, the real-time clocks RTCA and RTCC are generally subject to relative drift owing to unavoidable clock frequency fluctuations. The stated computation rule thus provides only the delay time corrupted by a time offset which is still unknown.

The time offset or the pure data packet delay time can be determined by the communications device C transmitting a further data packet (not illustrated) with further time information and with the time information AS, BE, BS and CE back via the network node B to the communications device A. Instead of the time information AS, BE, BS and CE, the provisional delay time determined in the communications device C may also be added to the further data packet.

Analogously to the method described above, the network node B adds further transmission and reception time information to the further data packet. Furthermore, the precise reception time of the further data packet is recorded by the communications device A. Analogously to the above statements a value (which is corrupted by the time offset of the real-time clocks RTCA and RTCC) for the pure delay time of the further data packet can then be determined in the communications device A. Since the time offset is included in the delay time of the further data packet, but with the opposite mathematical sign to that in the delay time of the data packet DP, the time offset can be eliminated by adding these two delay times. On the assumption that the delay times of the data packet DP and of the further data packet which is transmitted in the opposite direction approximately match one another, the relative time offset between the real-time clocks RTCA and RTCC can be calculated with a high level of accuracy. In order to minimize the influence of any relative drift in the real-time clocks RTCA and RTCC between the transmission of the data packet DP and of the further data packet, the further data packet should be transmitted as quickly as possible after reception of the data packet DP.

On the assumption that only the pure cable delay times need be taken into account for the data packet transmission between the communications devices A, C and the network node B, the time offset between the real-time clocks RTCA and RTCC can be determined sufficiently accurately even without sending back the further data packet. In many cases, the pure cable delay times are negligible.

The relative drift between the real-time clocks RTCA and RTCC can be measured by repeatedly transmitting data packets with time information in accordance with the above statements between the communications devices A and C, and by combining the times that are obtained.

Figure 2:
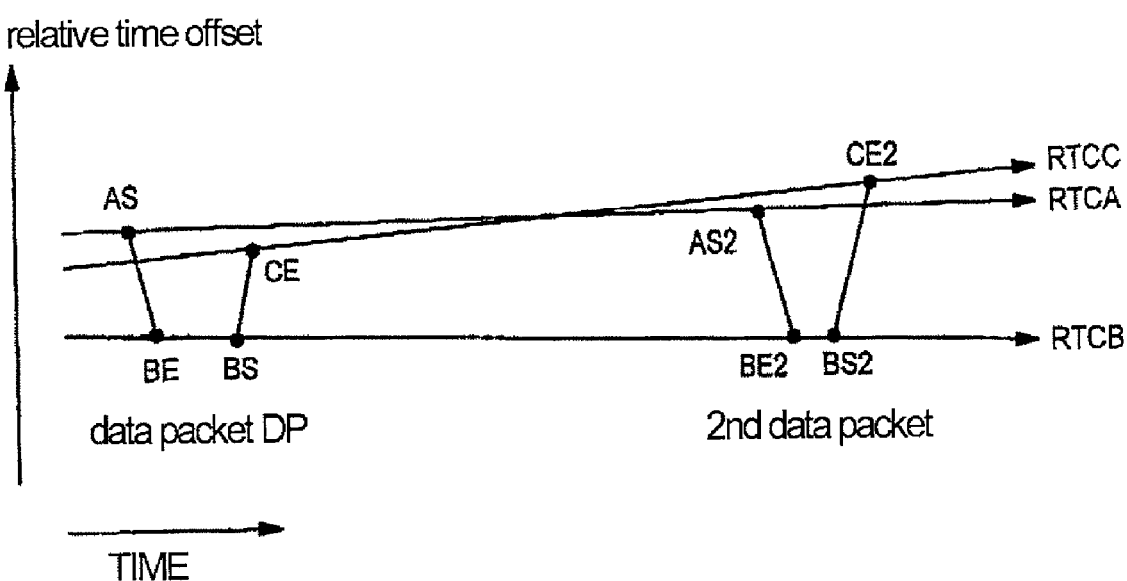
FIG. 2 shows a timing diagram related to a measurement of the relative drift of real-time clocks in the communications devices to be synchronized.

FIG. 2 shows a timing diagram for such a drift measurement, illustrated schematically. The timing diagram shows the relative time discrepancies between the real-time clocks RTCA, RTCB and RTCC by arrows, associated with the real-time clocks, in the time profile.

The transmission of the data packet DP is shown in the left-hand part of FIG. 2: the data packet DP is transmitted by the communications device A at a time at which the real-time clock RTCA indicates the time AS, together with this time information AS to the network node B. At the reception time, the real-time clock RTCB of the network node B indicates the time BE. The data packet DP is passed on to the communications device C after a processing time, which is not known precisely, and at a time at which the real-time clock RTCB indicates the time BS. On arrival of the data packet DP, the real-time clock RTCC for the communications device C indicates the time CE.

After a predetermined time interval, a second data packet is transmitted from the communications device A via the network node B to the communications device C in the same way as the data packet DP. The time interval should on the one hand be long enough to allow the relative drift between the real-time clocks RTCA and RTCC still to be recorded with sufficient accuracy, while on the other hand it should not be so great that the drift-dependent time offset exceeds any required synchronicity tolerance.

The second data packet is transmitted from the communications device A to the network node B together with transmission time information AS2 which is inserted at the transmission time. There, reception time information BE2 which indicates the reception time is called up from the real-time clock RTCB and is added, together with the transmission time information BS2 which indicates the time at which it is passed on, to the second data packet, and is transmitted to the communications device C. Finally, on reception of the second data packet, reception time information CE2 is called up from the real-time clock RTCC in the communications device C.

A relatively accurate value for the relative drift of the real-time clocks RTCA and RTCC can be determined by the communications device C from the time information AS, BE, BS, CE, AS2, BE2, BS2 and CE2 transmitted and determined in conjunction with the data packet DP and the second data packet. Better accuracy is achieved the smaller the fluctuations in the pure data packet delay time between the communications devices A, C and the network node B. If there are direct cable connections between the network node B and the communications devices A and C, the fluctuations in the data packet delay time—and frequently also the data packet delay times themselves—are negligible for synchronization purposes. The fluctuations in the packet delays in the network node B may be eliminated on the basis of the transmitted transmission and reception time information BE, BS and BE2, BS2. This means that it can be assumed that the actual physical time interval between AS and BE is equal to the physical time interval between AS2 and BE2, and that the physical time interval between BS and CE is equal to the physical time interval between BS2 and CE2. If the difference BE−AS differs from BE2−AS2, or the difference CE−BS differs from CE2−BS2, then this must be due to the relative drift between the real-time clocks RTCA, RTCB and RTCC. The calculation rule (BE2−AS2+CE2−BS2)−(BE−AS+CE−BS) thus results in a value for the relative drift of the real-time clock RTCC with respect to the real-time clock RTCA within the time interval between the transmission of the two data packets.

The real-time clock RTCC can be readjusted, and thus synchronized to the real-time clock RTCA, on the basis of the determined drift value. The determined drift value may also be used to readjust the frequency of a clock generator for the real-time clock RTCC or for the communications device C, in order to synchronize this to a clock generator for the communications device A. In order to ensure long-term synchronicity, data packets containing time information must preferably be transmitted at regular time intervals between the communications devices to be synchronized, in this case A and C.

The invention has been described in detail with particular reference to preferred embodiments thereof and examples, but it will be understood that variations and modifications can be effected within the spirit and scope of the invention.

The invention claimed is:

1. A method for transmitting time information via a data packet network, comprising:
   calling time information from a time information source;
   sending the time information to a data packet transmission module which times transmission of data packets;

transmitting the time information from a first communications device to a second communications device via a data packet;

using a transmission signal to coordinate transmission of the data packet and calling of the time information with respect to one another, the transmission signal indicating the time of transmission; and generating a reception signal when a data packet receiving module at the second communications device receives the data packet transmitted via the data packet network, the reception signal initiating a call for reception time information from a time information source in the second communications device wherein the second communications device passes on the data packet to a third communications device, pass-on-information indicates the time at which the data packet is passed on to the third communications device, and the reception time information and the pass-on-information are passed on, with the data packet.

2. The method as claimed in claim 1, wherein the transmission signal is generated by the time information source.

3. The method as claimed in claim 1, wherein the transmission signal is generated by the data packet transmission module.

4. The method as claimed in claim 1, wherein
the data packet transmission module generates the transmission signal while the data packet is being transmitted, and
the transmission signal initiates the calling of the time information.

5. The method as claimed in claim 1, wherein
the time information source generates the transmission signal at a predetermined time, and
transmission of the data packet is initiated by the transmission signal.

6. The method as claimed in claim 1, wherein the data packet is transmitted using a TCP/IP transmission protocol.

7. The method as claimed in claim 1, wherein any relative discrepancy between the time information sources of the first and second communications devices is determined on the basis of the time information of the first communications device and the reception time information of the second communications device.

8. The method as claimed in claim 1, wherein the transmission signal and reception signal are generated by hardware components.

9. The method as claimed in claim 1, wherein the physical layer of the OSI reference model is used for at least one of generating and evaluating the transmission signal and the reception signal.

10. The method as claimed in claim 1, wherein,
when the data packet is received at the third communications device after being passed on, pass-receive-information is called from a time information source in the third communications device, and
any relative discrepancy between the time information sources of the first through third communications devices is determined on the basis of the transmitted time information, the reception time information, the pass-on-information, and the pass-receive-information.

11. The method as claimed in claim 1, wherein the transmission signal is generated by a hardware component.

12. The method as claimed in claim 1, wherein the physical layer of the OSI reference model is used for at least one of generating and evaluating the transmission signal.

13. The method as claimed in claim 5, wherein the data packet is transmitted using a TCP/IP transmission protocol.

14. The method as claimed in claim 13, wherein any relative discrepancy between the time information sources of the first and second communications devices is determined on the basis of the time information of the first communications device and the reception time information of the second communications device.

15. The method as claimed in claim 14, wherein the transmission signal and reception signal are generated by hardware components.

16. The method as claimed in claim 14, wherein the physical layer of the OSI reference model is used for at least one of generating and evaluating the transmission signal and the reception signal.

17. The method as claimed in claim 14, wherein,
when the data packet is received at the third communications device after being passed on, pass-receive-information is called, and
any relative discrepancy between the time information sources of the first through third communications devices is determined on the basis of the transmitted time information, the reception time information, the pass-on-information, and the pass-receive-information.

* * * * *